Oct. 12, 1954
M. J. SECONDO
2,691,353
MULTIROW SEED PLANTER
Filed April 10, 1951
3 Sheets-Sheet 1
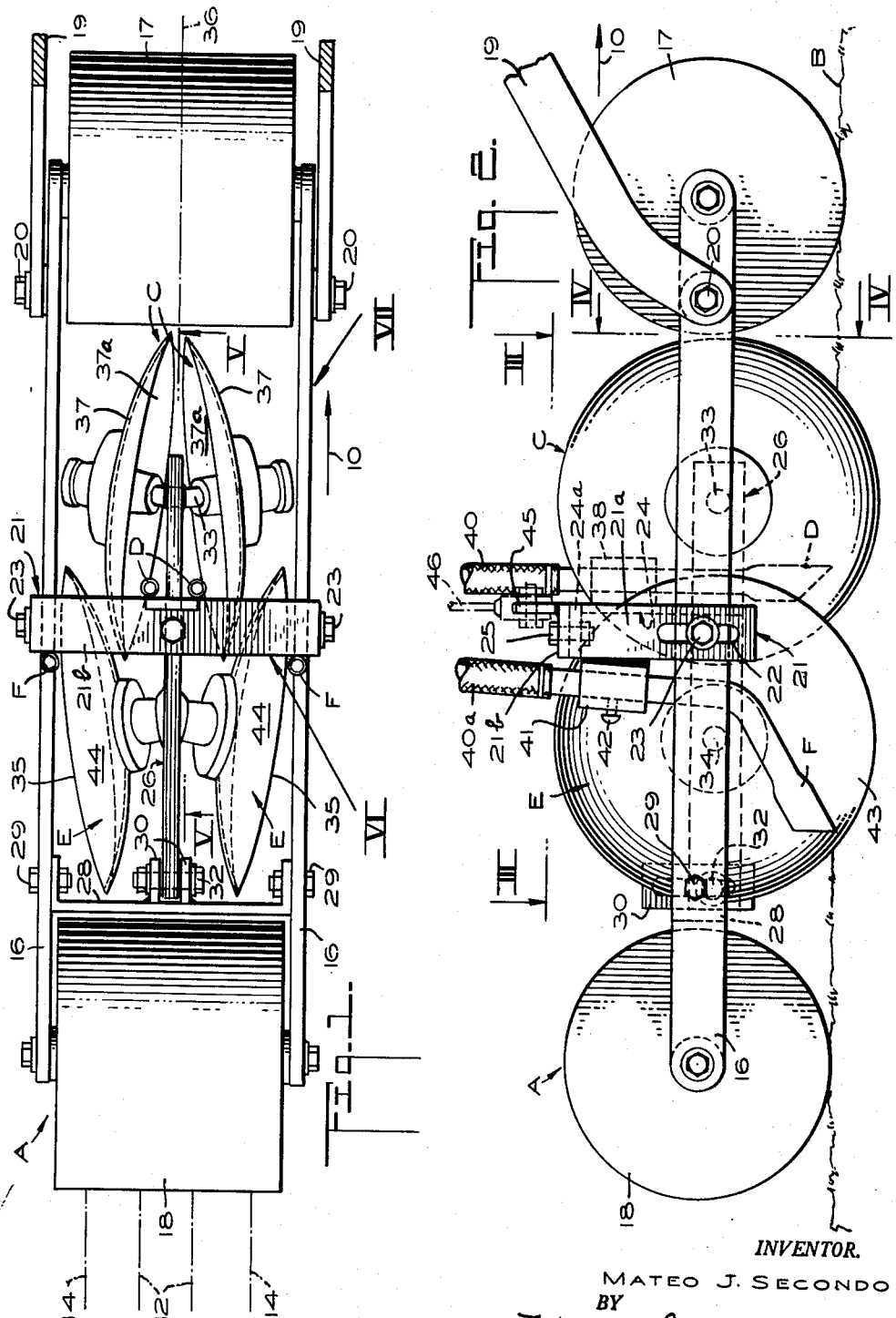
INVENTOR.
MATEO J. SECONDO
BY
Muna, Liddy & Glaccum
ATTORNEYS Oct. 12, 1954 — M. J. SECONDO — 2,691,353
MULTIROW SEED PLANTER
Filed April 10, 1951 — 3 Sheets-Sheet 2
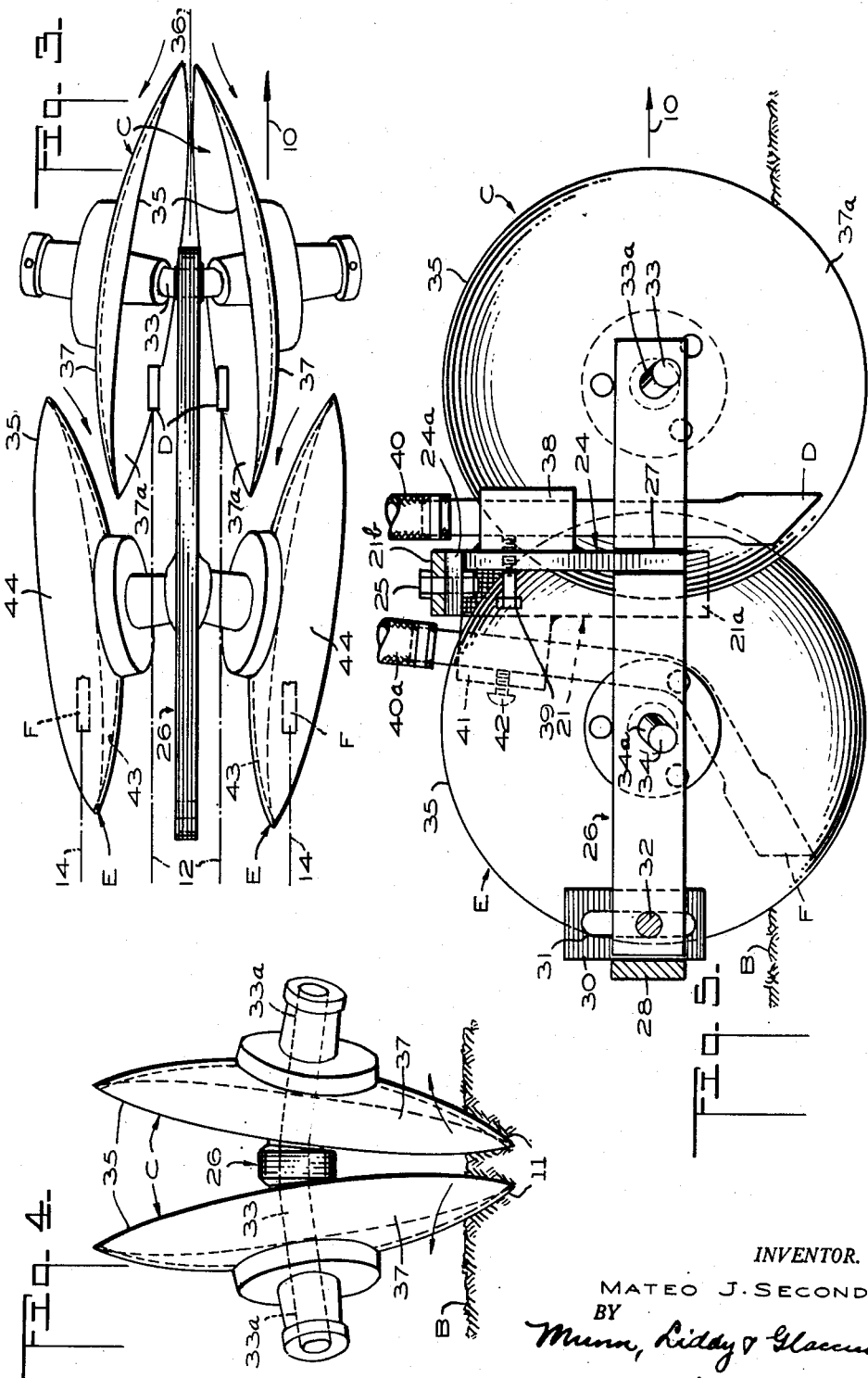
INVENTOR.
MATEO J. SECONDO
BY
Munn, Liddy & Glaccum
ATTORNEYS

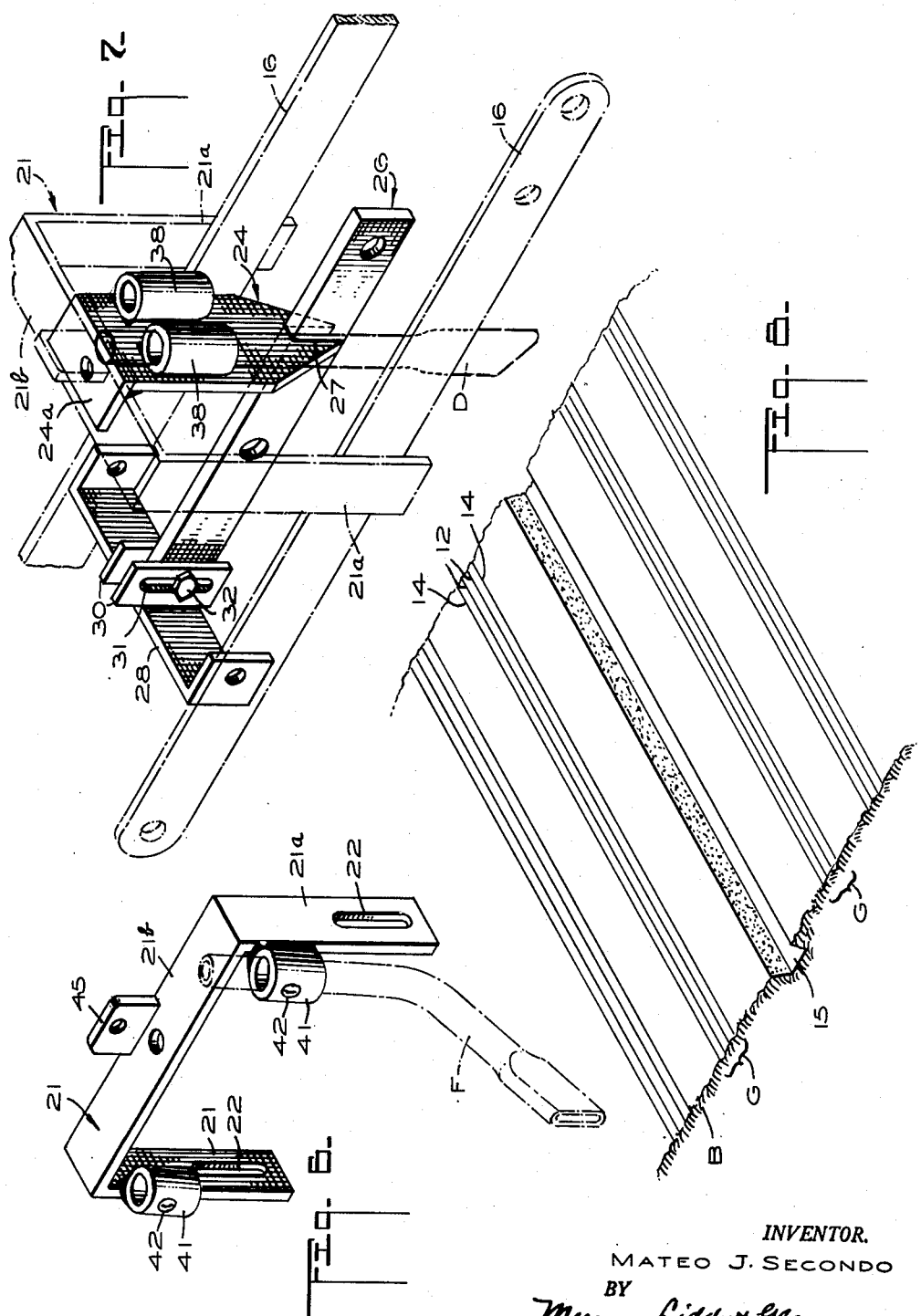

Patented Oct. 12, 1954

2,691,353

UNITED STATES PATENT OFFICE 2,691,353

MULTIROW SEED PLANTER

Mateo J. Secondo, Salinas, Calif.

Application April 10, 1951, Serial No. 220,214

1 Claim. (Cl. 111—52)

The present invention relates to improvements in a multi-row seed planter. It consists of the combinations, constructions, and arrangements of parts, as hereinafter described and claimed.

An object of this invention is to provide a seed planter, which is adapted to be operated at a relatively high speed, displacing the minimum amount of soil to form the necessary furrows in the ground, all without throwing the soil during the rapid advancement of the implement.

More specifically stated, I make use of concavo-convex discs, which are mounted on a suitable carriage. These discs project into the ground so as to form furrows therein. As a particular feature, the discs are supported in such a manner that the convex faces thereof are disposed for cutting the furrows, and this arrangement will reduce the amount of soil displaced. Seed-delivery tubes are positioned for feeding seeds into the furrows on the concave faces of the discs. As the implement is advanced, the soil is back-filled over the planted seed.

Other objects and advantages will appear as the specification continues. The novel features of the invention will be pointed out in the claims hereunto appended.

Drawings

For a better understanding of the invention, reference should be had to the accompanying drawings, forming part of this application, in which:

Figure 1 is a top plan view of a multi-row seed planter, made in accordance with my invention;

Figure 2 is a side elevational view thereof;

Figure 3 is a fragmental plan view of the central portion of the implement, as seen from the plane III—III of Figure 2;

Figure 4 is a front elevational view of the leading pair of discs, looking from the transverse plane IV—IV of Figure 2;

Figure 5 is an enlarged longitudinal sectional view, taken along the line V—V of Figure 1;

Figure 6 is an isometric view of a yoke that I employ, as seen from the direction of the arrow VI in Figure 1;

Figure 7 is a fragmentary isometric view of parts of the implement, when observing the latter in the direction of the arrow VII in Figure 1; and Figure 8 is a diagrammatic isometric view, suggesting several rows of seeds planted by my implement.

While I have shown only the preferred form of my invention, it should be understood that various changes, or modifications may be made within the scope of the annexed claims, without departing from the spirit thereof.

Detailed description

The multi-row seed planter is provided with a carriage, indicated generally at A, which is movable over ground B in which seed is to be planted. During the advancement of the carriage along the ground in the direction of the arrows 10, a leading pair of discs C form furrows 11 in the ground (see Figure 4). A forward set of seed-delivery tubes D are positioned to deliver seeds to these furrows, providing inner rows 12 of planted seed (see Figures 1, 3 and 8).

At the same time, a trailing pair of discs E form additional furrows in the ground, into which seed are discharged by a rear set of seed-delivery tubes F. The seed planted by the discs E and tubes F define outer rows 14 (see Figures 1, 3 and 8).

It will be quite apparent as the specification continues that my implement may be duplicated so that a series of rows may be planted simultaneously as suggested in Figure 8. This view further discloses an irrigation ditch 15 fashioned between adjacent groups G of planted rows.

Now I shall refer to the structural features of the carriage A. This carriage includes a pair of spaced-apart side bars 16 having front and back ground-engaging rollers 17 and 18, respectively, journalled therebetween. For the purpose of advancing the carriage, draft arms 19 are swingably secured by pivot bolts 20 to the side bars 16. Of course, any suitable traction vehicle may be employed for advancing the carriage over the ground at the proper speed.

As illustrated in Figures 1, 2 and 5-7, an inverted U-shaped yoke 21 is mounted substantially midway of the carriage. This yoke has its sides 21a slotted at 22. Studs 23 (see Figures 1 and 2), or bolts, pass through these slots and clamp the yoke to the side bars 16 of the carriage. The top transverse reach 21b of this yoke may be adjusted vertically due to the provision of the slots 22 and the studs 23.

It will be noted from Figures 5 and 7 that an inverted L-shaped bracket 24 is mounted between the sides of the yoke 21. This bracket has a foot 24a at its top, which underlies the reach 21b of the yoke and is fastened to the latter by a bolt 25. Accordingly, the bracket may be adjusted vertically with the yoke.

The lower end of the bracket 24 has a longitudinally-extending draw-bar 26 welded thereto at 27, or otherwise anchored together. In Figures 1, 2

5 and 7, I illustrate a transverse member 28, which is fastened by bolts 29 to the side bars 16 of the carriage. Spaced-apart ears 30 are fixed to the member 28 so as to straddle the rear end of the draw-bar 26. These ears are slotted as at 31, through which a clamping bolt 32 passes. Thus, the draw-bar may be raised, or lowered, when the bolts 23 and 32 are loosened.

The draw-bar 26 constitutes a vertically-adjustable support for the leading and trailing pairs of discs C and E, respectively. A forward shaft 33 is fixed to this draw-bar so as to extend on opposite sides thereof. As shown in Figure 5, the end sections 33a of this shaft slope downwardly and forwardly. The leading pairs of discs C are journalled for rotation on these end sections of the shaft 33, as clearly shown in Figures 3 and 4.

In a like manner, a rear shaft 34 is fixed to the draw-bar 26 to project on opposite sides of this bar. However, Figure 5 discloses the end sections 34a of the shaft as sloping downwardly and rearwardly. The pair of trailing discs E are rotatably carried on the end sections of the rear shaft.

All four of the discs C—C and E—E are of the concavo-convex type. Each is provided with a rim 35 that lies in a plane. The rim planes of the leading discs C converge forwardly relative to the axis of advancement 36 of the carriage (see Figures 1 and 3); also, the rim planes of the discs are set slantingly relative to vertical and converge downwardly. The disposition of these rim planes is due to the downward and forward sloping of the shaft sections 33a about which the discs C must rotate.

The rim planes of the trailing discs E converge rearwardly relative to the axis of advancement 36 of the carriage; and are set to slant relative to vertical, converging downwardly. This peculiar arrangement of the rim planes of the trailing pair of discs is occasioned by the downward and rearward sloping of the shaft sections 34a.

It will be quite apparent from Figures 1, 3 and 4 that the convex faces 37 of the discs C bear against the ground and divert soil out of the furrows as the carriage is advanced. By utilizing these convex faces, the soil will not be thrown to any great extent, even though the carriage is advanced at a relatively high speed.

The seed-delivery tubes D are arranged at a trailing section of the discs C on the concave faces 37a thereof. These tubes are supported in sleeves 38 carried by the bracket 24 (see Figure 7). Set-screws 39 clamp the tubes D to the sleeves 38, as clearly disclosed in Figure 5. The upper ends of these tubes communicate with flexible conduits 40, which leads to a conventional mechanically-operated seed box (not shown).

With reference to the rear set of seed-delivery tubes F, they are telescoped through sleeves 41 and clamped thereto by set-screws 42. As clearly shown in Figure 6, these sleeves are welded, or otherwise secured, to the sides 21a of the yoke 21. These tubes deliver seeds on the concave faces 43 of the trailing discs E, and receive seed through a flexible conduit 40a leading from a seeder box.

The convex faces 44 of the discs E are disposed to bear against the soil. As the carriage is advanced, the discs E serve to back-fill soil into the furrows formed by the discs C. The back roller 18 fills in the furrow provided by the discs E.

For lifting the carriage A vertically, I provide a lug 45 on reach 21b of the yoke 21. This lug may be attached to a suitable lifting device indicated at 46 in Figure 2. The slots 22 and 31 in the yoke 21 and ears 30, respectively, permit the depth of seeding to be adjusted. Uniform rows of seeds are planted.

*Summary*

The adjustment and operation of my multi-row seed planter is summarized briefly as follows:

In setting up the implement prior to planting seed, the leading and trailing pairs of discs C and E are adjusted vertically, so that the lower peripheral portions of these discs will penetrate into the ground B to the desired depth as the rollers 17—18 ride over the ground. This is accomplished by loosening the bolts 23 and 32; adjusting the yoke 21 and the draw-bar 26 in a vertical direction; and thereafter tightening these bolts.

As the carriage A is advanced in the direction of the arrows 10, the discs C will form furrows 11 in the ground, as suggested in Figure 4. The soil from these furrows will glide over the convex faces 37 of the discs C. The forward set of tubes D will deliver seed into the furrows thus provided, planting the seed along the inner rows 12—12 (see Figures 1 and 3).

The trailing pair of discs E are reversed relative to the leading discs C. Soil will be directed by the convex faces 44 of the trailing pair of discs so as to back-fill the furrows previously fashioned by the leading pair of discs. At the same time, the discs E will provide furrows in the ground into which the rear set of tubes F will deliver seed. These seeds are planted in the outer rows 14—14. As the carriage continues to advance along the axis 36, the roller 18 will fill the furrows that were formed by the discs E. This roller will press the soil down in the rows 12—12 and 14—14.

Inasmuch as the convex faces of the discs are employed for furrowing the soil, the latter will not be thrown to any great extent, even when the carriage is moved forwardly at a relatively high speed. The minimum amount of soil is disturbed.

As previously pointed out, a series of my implements may be attached to a suitable traction device, thus planting a plurality of groups of rows simultaneously, as suggested in Figure 8 of the drawings.

I claim:

In a multi-row seed planter: a carriage movable over the soil along a longitudinal axis of advancement, said carriage having a longitudinally-extending substantially horizontally-disposed bar secured thereto; front and rear shafts fastened to said bar, each shaft having end sections projecting on opposite sides of the bar; the end sections of the front shaft sloping downwardly and forwardly, and the end sections of the rear shaft extending downwardly and rearwardly; a leading pair of concavo-convex discs rotatably mounted on the end sections of the front shaft and disposed to cut an inner set of furrows in the soil as the carriage is advanced; a trailing pair of concavo-convex discs journalled on the end sections of the rear shaft and disposed laterally beyond the leading discs for cutting an outer set of furrows in the soil; all of said discs having marginal rims contained in planes disposed slantingly both relative to the vertical and to the axis of advancement of the carriage; the planes containing the marginal rims of the leading discs converging forwardly and downwardly relative to one another, and the planes containing the marginal rims of the trailing discs converging rearwardly and downwardly with respect to each other; the convex faces of all of the discs being disposed to actively bear against and divert the soil to form furrows as the carriage is advanced; feed tubes mounted on said carriage and arranged to deliver seed into the furrows; the trailing discs being positioned adjacent and in straddling relation to the leading discs so that leading peripheral portions of the former are in overlapping relation to trailing peripheral portions of the latter with the trailing discs outwardly spaced from the leading discs to provide passageways through which soil diverted outwardly by the leading discs in forming the inner set of furrows is returned by the trailing discs back into the last-mentioned furrows; said bar and shafts and discs forming a unitary structure; and means on said carriage for back-filling soil into the outer set of furrows as the carriage is advanced.

References Cited in the file of this patent

UNITED STATES PATENTS

| Number | Name | Date |
|---|---|---|
| 33,103 | Pond | Aug. 20, 1861 |
| 144,918 | Moore | Nov. 25, 1873 |
| 340,190 | Beebe | Apr. 20, 1886 |
| 347,982 | Arnett | Aug. 24, 1886 |
| 413,394 | Genung | Oct. 22, 1889 |
| 461,011 | Cowie | Oct. 13, 1891 |
| 526,436 | Campbell | Sept. 25, 1894 |
| 605,755 | Simpson et al. | June 14, 1898 |
| 630,353 | Hoyt | Aug. 8, 1899 |
| 731,645 | Wilson | June 23, 1903 |
| 822,617 | Lohr | June 5, 1906 |
| 903,235 | Schutt | Nov. 10, 1908 |
| 1,084,307 | Altgelt | Jan. 13, 1914 |
| 1,478,753 | Mooij | Dec. 25, 1923 |
| 2,297,384 | Benjamin | Sept. 29, 1942 |

FOREIGN PATENTS

| Number | Country | Date |
|---|---|---|
| 301,207 | Great Britain | Nov. 29, 1928 |